Oct. 27, 1925.
C. M. POOLE
1,559,368
EXTENSION AXLE
Filed April 27, 1925
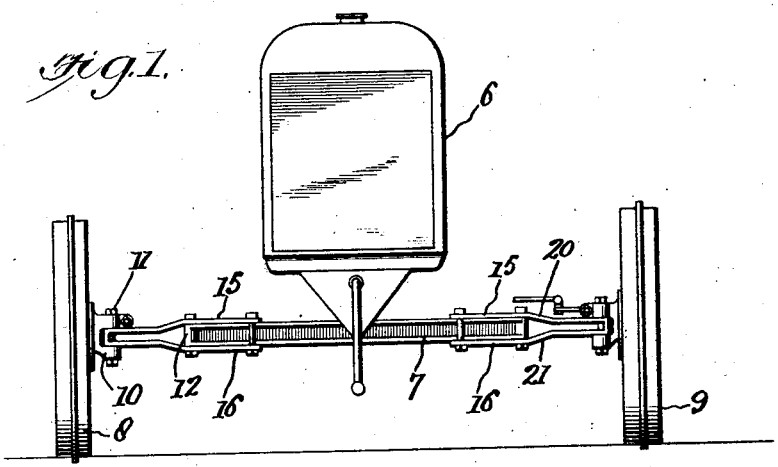
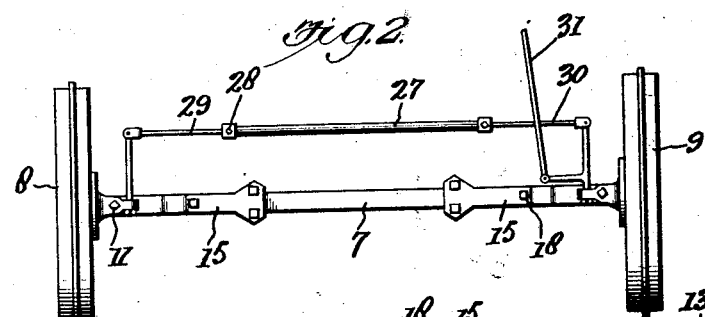
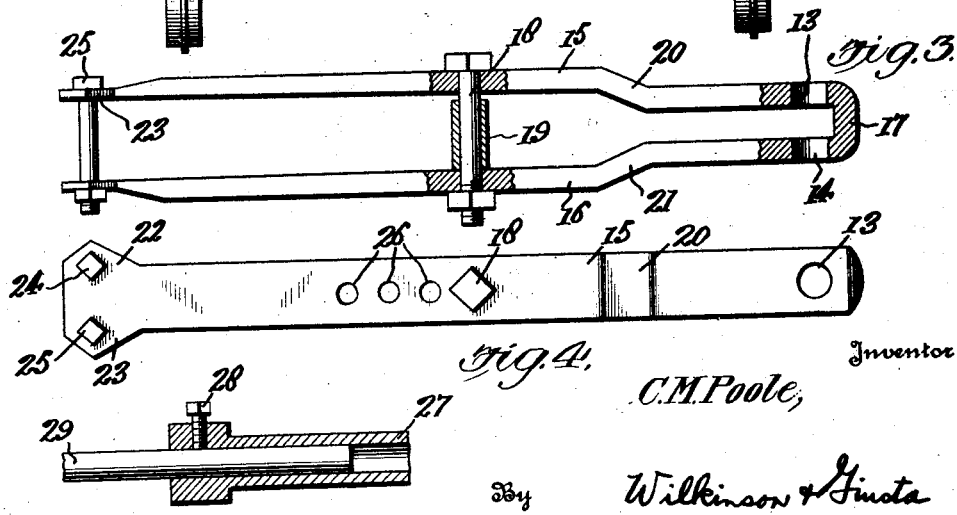

Patented Oct. 27, 1925.

1,559,368

UNITED STATES PATENT OFFICE.

CHARLES M. POOLE, OF WACO, TEXAS, ASSIGNOR, BY MESNE ASSIGNMENTS, TO TEXAS LA CROSSE COMPANY, A CORPORATION.

EXTENSION AXLE.

Application filed April 27, 1925. Serial No. 26,214.

*To all whom it may concern:*

Be it known that I, CHARLES M. POOLE, a citizen of the United States, residing at Waco, in the county of McLennan and State of Texas, have invented certain new and useful Improvements in Extension Axles; and I do hereby declare the following to be a full, clear, and exact description of the invention, such as will enable others skilled in the art to which it appertains to make and use the same.

The present invention relates to extension axles, and has for an object to provide a simple, strong and inexpensive attachment for tractor and other axles whereby, without requiring any alteration in the present axle structure, the tread of the wheels may be spread to a variety of degrees.

The device will be found particularly useful in connection with tractors for drawing the agricultural implements where the crop rows are placed at various widths. The standard tread of a tractor does not permit of its use for cultivating purposes or in the South where the land is listed.

The further purpose of the invention is to provide for widening the normal tractor tread to admit of its straddling two rows thereby extending its use on the farm greatly.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front view of a tractor shown with the improved extension axle.

Figure 2 is a plan view of axle wheels and steering device with the improvement embodied therein.

Figure 3 is a front view on an enlarged scale, and with parts broken away of the improved extension attachment.

Figure 4 is a top plan view of the same, and

Figure 5 is a longitudinal section taken through a portion of the steering attachment.

Referring more particularly to the drawings, 6 designates a tractor of the Fordson or other type having the front axle 7 and the wheels 8 and 9. The steering knuckles are indicated at 10, and the pivot bolts 11 on which the wheels turn in the act of steering the device.

In accordance with the invention, the wheels 8 and 9 are spread apart a distance greater than that of the normal tread of the tractor. Normally, the pivot bolts 11 pass through the end bushings 12 of the axle 7. In this case, however, the pivot bolts are passed through the vertically alined openings 13 and 14 in the outer end of the extension axle attachment, which comprises the upper and lower legs 15 and 16, preferably made in one piece of flat bar metal united at the yoke end 17 where the legs are brought closer together to reinforce and strengthen the construction and to admit of being placed in the socket in the steering knuckle 10 of the wheel. The inner more widely spaced portions of the legs 15 and 16 are so arranged as to fit upon the upper and lower faces of the axle 7. A bolt 18 is arranged to pass through the legs 15 and 16 and through the outer axle bushing 12. The shank of the bolt 18 may or may not have the sleeve bushing 19 as shown in Figure 3. In case this sleeve bushing is used, it is adapted to fit down within the axle bushing 12. Intermediate their ends, the legs are provided with diagonal portions 20 and 21 joining the more widely separated inner portions with the closely spaced outer portions. The diagonal portions converge from the axle bushing 12, and these diagonal portions serve to absorb the strains transmitted longitudinally through the axle attachment. The innermost ends of the legs 15 and 16 are provided with oppositely extending flanges 22 and 23 provided with perforations to receive the bolts 24 and 25, which straddle the axle 7. The three bolts 18, 24 and 25 form a triangular structure for reinforcing the axle against vertical strains, and also against horizontally acting strains tending to rotate the extension attachment about the bolt 18.

As shown in Figure 4, a series of openings 26 are made in the intermediate portion of the legs for selectively receiving the center bolt 18 whereby the tread of the wheels may be adjusted as desired.

From the nature and construction of the extension axle it will be seen that when the extension is secured in place at the end of the front axle 7 as shown in Figure 1, there will be permitted between the end of the main axle and the wheel support at the end of the extension more or less vertical vibration, such vertical vibration being largely caused by the explosions in the cylinders of the engine, but to some extent by the nature of the ground over which the tractor may be moving. It has been observed that where an axle extends rigidly straight through, and especially where a rigid extension to a main axle is rigidly secured to the main axle, such vibration exerts a very unfavorable effect on the life of the axle, or on the extension. By so constructing the extension axle as to permit of vibration vertically therein, even though the extension be rigidly connected to the main axle, the unfortunate results of the inevitable vibration caused as explained are very largely overcome, and the life of the device very much prolonged.

The steering apparatus is also arranged to be adjustable by the provision of a tubular tie rod 27 having enlarged ends provided with set screws 28 for receiving the bars 29 and 30 forming parts of the usual steering connections. The bars 29 and 30 may be adjusted in and out the extension tie rod 27. The set screws 28 will hold the bars in the adjusted position and permit of transmission of the steering motion from the link 31 or bolt knuckles of the front wheels 8 and 9.

The device constitutes merely an attachment, and in no way disturbs the present construction, and it does not affect the turning radius of the tractor. The extension axles bolt firmly to the regular axle, and when installed, they become a part of such regular axle. The device may be made in any sizes, and out of any appropriate material.

It is obvious that various changes and modifications may be made in the details of construction and design of the above specifically described embodiment of this invention without departing from the spirit thereof, such changes and modifications being restricted only by the scope of the following claims.

What is claimed is:

1. An extension axle for attachment to the usual motor vehicle axle having a coupling eye at its end comprising a pair of legs for adjustably fitting against the upper and lower sides of said usual axle, means for clamping the inner ends of the legs against the axle when the legs are adjusted, and locking means engageable with said coupling eye of said axle and adjustably engaging both legs of the pair for securing the legs in adjusted position, said legs projecting beyond the end of said usual axle and having a coupling eye therein corresponding to the coupling eye of said usual axle.

2. An extension axle for attachment to the usual motor vehicle axle having a coupling eye at its end, comprising a flat bar returned upon itself to provide a pair of flat legs for adjustable engagement against the opposite sides of said usual axle and having edgewise enlargements at their free ends, clamping bolts carried through said enlargements for drawing the legs toward each other and clamping them upon said usual axle, the intermediate portions of said legs having series of registering openings therethrough adapted to register one pair at a time with said coupling eye of the usual axle, and a bolt for removable insertion in the selected openings of the legs and through said coupling eye to anchor the legs from swinging on said usual axle, the intermediate portions of said legs converging toward each other outwardly from the series of openings and the outer ends of the legs having spindle receiving openings therein adjacent to the outward portion of the flat bar for attachment of the vehicle wheel.

CHAS. M. POOLE.